US010690145B2

(12) United States Patent
Zimmerman

(10) Patent No.: US 10,690,145 B2
(45) Date of Patent: Jun. 23, 2020

(54) TURBO HOUSING

(71) Applicant: Wayne M. Zimmerman, Cantril, IA (US)

(72) Inventor: Wayne M. Zimmerman, Cantril, IA (US)

(73) Assignee: Air-Tec Innovations, LLC, Cantril, IA (US)

( * ) Notice: Subject to any disclaimer, the term of this patent is extended or adjusted under 35 U.S.C. 154(b) by 141 days.

(21) Appl. No.: 15/965,467

(22) Filed: Apr. 27, 2018

(65) Prior Publication Data

US 2019/0331129 A1 Oct. 31, 2019

(51) Int. Cl.
| F04D 29/42 | (2006.01) |
| F02B 37/00 | (2006.01) |

(52) U.S. Cl.
CPC .......... F04D 29/4206 (2013.01); *F02B 37/00* (2013.01)

(58) Field of Classification Search
CPC .................... F05D 2260/33; F05D 2260/39
See application file for complete search history.

(56) References Cited

U.S. PATENT DOCUMENTS

| 7,204,241 B2 | 4/2007 | Thompson et al. |
| 7,984,612 B2 | 7/2011 | Weymann |
| 8,419,359 B2 | 4/2013 | Cvjeticanin et al. |
| 8,820,071 B2 * | 9/2014 | Tkac ..................... F02B 37/00 415/183 |
| 9,482,240 B2 | 11/2016 | Gerard et al. |
| 9,771,856 B2 | 9/2017 | Nakao |
| 9,803,651 B2 | 10/2017 | Hall |
| 2012/0260652 A1 | 10/2012 | Hiry et al. |
| 2018/0100427 A1* | 4/2018 | Tsukiyama ............ F01D 25/243 |

FOREIGN PATENT DOCUMENTS

| EP | 2940285 A1 | 11/2015 |
| WO | 2018022092 A1 | 2/2018 |

OTHER PUBLICATIONS

BorgWarner Turbo Systems—TechTG-1110-B—Year: 2010—pp. 76-77.*
ATP Turbo, "3.5" V-Band Flange & Clamp Set—V-Band Compressor Outlet—Borg Warner S400 and S500 Series SX SXE", Prior to Apr. 27, 2018.
Himni Racing: "Huge Super T6 Semi Turbo 5.75" V-Band Flange & Clamp Kit", Prior to Apr. 27, 2018.
Treadstone Performance Engineering Inc., "Precision V-Band in/out Turbine Housing Inlet V Band Flange", Prior to Apr. 27, 2018.
TurboZentrum, "Holset Hx35—Hx50 Compressor Outlet V-Band Flange", Prior to Apr. 27, 2018.

* cited by examiner

*Primary Examiner* — Igor Kershteyn
*Assistant Examiner* — Juan G Flores
(74) *Attorney, Agent, or Firm* — Goodhue, Coleman & Owens, P.C.

(57) ABSTRACT

A turbo compressor housing includes a main compressor housing body and an outside portion between an air intake inlet and the main compressor housing body. The outside portion is configured to adapt the turbo compressor housing to interchangeably connect with one of (1) a hose and (2) a V-band connection and flange such that in a first configuration the hose is connected to the outside portion and in a second configuration the V-band secures the flange to the outside portion.

8 Claims, 5 Drawing Sheets

TURBO HOUSING

FIELD OF THE INVENTION

The present invention relates to turbo chargers. More particularly, but not exclusively, the present invention relates to a housing used for a turbocharger.

BACKGROUND

Turbochargers may be used in vehicles such as heavy trucks and sometimes in light trucks or autos. Generally, exhaust air powers a turbine to force more air into the combustion chamber thereby increasing the internal combustion engine's power output and/or efficiency.

A turbocharger assembly generally includes a turbine housing, center housing, and a compressor housing. The compressor housing generally provides a connection for the compressor inlet, and a connection for the compressor outlet.

Machining, welding, cutting, and other processes are often used to modify the compressor inlet or connections associated therewith. This is problematic for numerous reasons. For example, this may be time consuming for some individuals to perform themselves and expense if others perform it. In addition, where such processes occur, it may make it difficult to remove or re-configure the compressor inlet such as if the individual wants to use the turbocharger on a different vehicle or re-configure the manner in which the air intake is received.

Therefore, what is needed is an improved turbocharger with a compressor housing adapted to interchangeably accommodate different types of connections for air intake.

SUMMARY

Therefore, it is a primary object, feature, or advantage of the present invention to improve over the state of the art.

It is a further object, feature, or advantage of the present invention to provide an improved compressor housing for a turbocharger.

It is a still further object, feature, or advantage of the present invention to provide a compressor housing which reduces or eliminates the need for machining, welding, or cutting to modify the compressor inlet or connections associated therewith.

Another object, feature, or advantage is to provide a compressor housing which readily adapts to a hose connector or a V-band connection at the air intake.

Yet another object, feature, or advantage is to provide a compressor housing which is easy to install.

A further object, feature, or advantage is to provide a compressor housing which may be readily removed and re-installed into a different vehicle.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, a turbo compressor housing includes a main compressor housing body and an outside portion between an air intake inlet and the main compressor housing body. The outside portion is configured to adapt the turbo compressor housing to interchangeably connect with one of (1) a hose and (2) a V-band connection and flange such that in a first configuration the hose is connected to the outside portion and in a second configuration the V-band secures the flange to the outside portion.

According to another aspect, a turbo compressor housing includes a main compressor housing body, a transition portion extending from the main compressor housing body towards an air inlet, an outer ring portion extending outwardly from the transition portion, a lower lip extending outwardly from the outer ring portion, the lower lip having a diameter less than the outer ring portion, a receiving portion extending outwardly from the lower lip, and an upper lip extending outwardly from the receiving portion. The turbo compressor housing is adapted to interchangeably connect with one of (1) a hose and (2) a V-band connection and flange such that in a first configuration the hose is connected to the outside portion and in a second configuration the V-band secures the flange to the outside portion. In the second configuration, an O-ring may be positioned around the outside portion and rests on the outer ring portion and the flange may be positioned in place with an end of the flange resting against the O-ring and the outer ring portion.

According to another aspect a system includes a flange, a V-band connection, and a turbo compressor housing which includes (a) a main compressor housing body, (b) an outside portion between an air intake inlet and the main compressor housing body. The outside portion of the turbo compressor housing is configured to adapt the turbo compressor housing to interchangeably connect with one of (1) a hose and (2) the V-band connection and the flange such that in a first configuration the hose is connected to the outside portion and in a second configuration the V-band connection secures the flange to the outside portion. The system may further include an O-ring for positioned around the outside portion to rest on the outer ring portion.

BRIEF DESCRIPTION OF THE DRAWINGS

Illustrated embodiments of the disclosure are described in detail below with reference to the attached drawing figures, which are incorporated by reference herein.

DETAILED DESCRIPTION

The invention relates to a turbo-charger as most often used in heavy trucks and some in light trucks or possibly autos. Generally, exhaust air powers a turbine to force more air into the combustion chamber thereby increasing the internal combustion engine's power output and/or efficiency. More particularly, the invention relates to the manner in which the inlet side of the turbo-charger is connected to provide a cold air intake without requiring welding, cutting, or machining to be performed. The compressor housing is readily adapted for either a V-band or a hose connection. These different types of connections can be interchanged easily and without welding, cutting, or machining being required.

Figure 1:
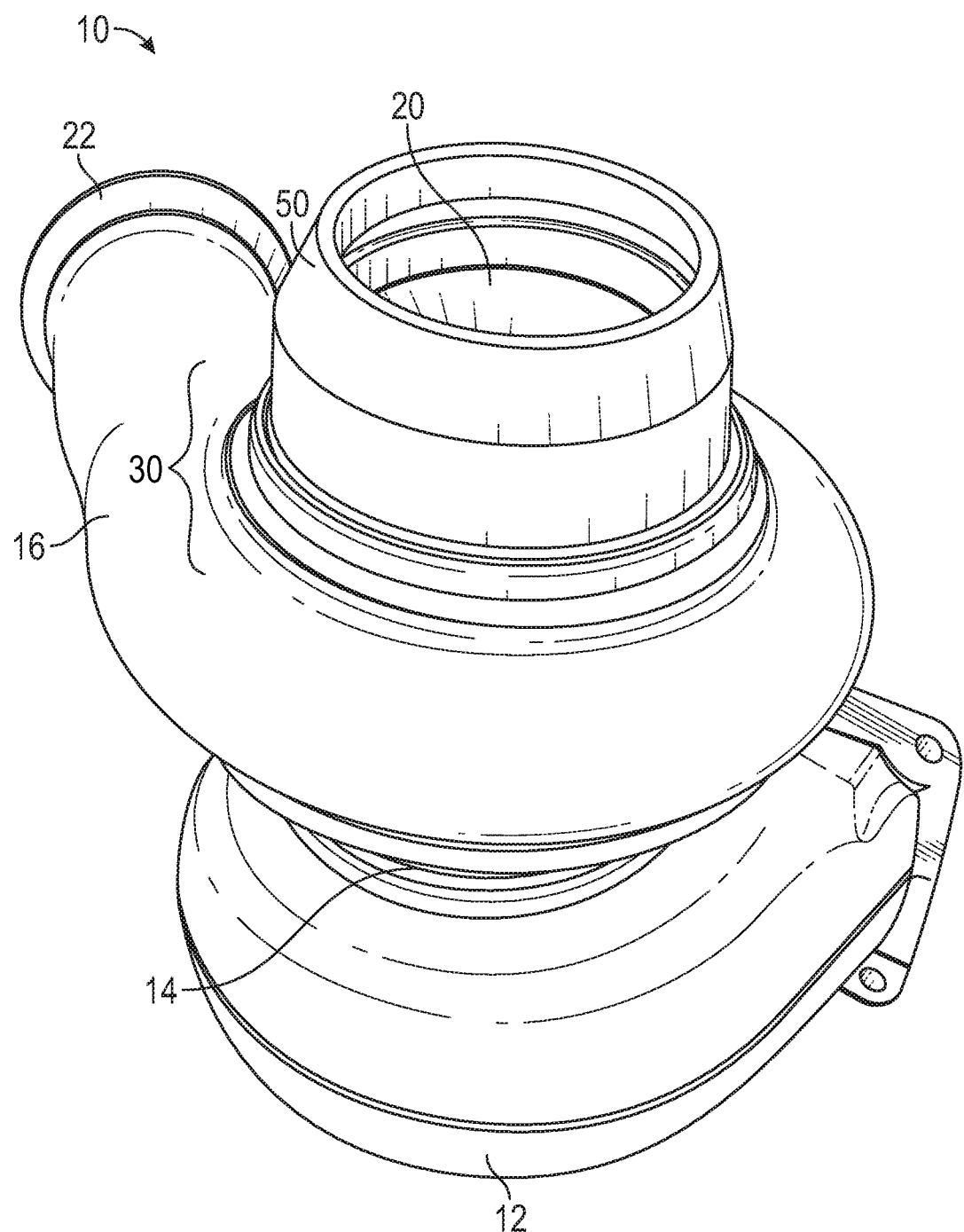
FIG. 1 is a perspective view of a turbocharger assembly.

FIG. 1 illustrates a turbocharger assembly 10. The turbocharger assembly 10 generally includes a turbine housing 12, center housing 14, and a compressor housing 16. The compressor housing 16 generally provides a connection for the compressor inlet 20, and a connection for the compressor outlet 22. In operation, ambient air is received through the compressor inlet 20. A compressor wheel rotates at a high speed, acting as a suction fan allowing air in at a higher than atmospheric pressure. The compressor wheel is positioned at one end of a shaft and rotates because outgoing exhaust gases rotate a turbine wheel on an opposite end of the shaft. A flange 50 is shown in FIG. 1 which is secured to the compressor housing with a V-band connection.

The present invention relates to the manner in which the compressor inlet 20 side of the turbocharger assembly 10 is connected to provide a cold air intake without requiring welding, cutting, or machining to be performed. In particular, the compressor housing 16 allows for either a V-band connection or a hose connection to be used interchangeably. Thus, in a first configuration the hose is connected to the outside portion of the compressor housing and in a second configuration the V-band is clamped to the outside portion to secure the flange 50. Because of the structure of the compressor housing 16 and its outside portion, the first configuration and the second configuration are interchangeable. Thus, cutting, welding, and machining is not needed to alter the configuration.

The turbocharger assembly 10 has a compressor housing 16 with an outside portion 30 which may be integrated into molding for the compressor housing 16 or caste as a separate piece or machined as a separate piece. This outside portion 30 is "universal" in that it allows for either a hose or a v-band connection to be fitted. Separate flanges of different types may be connected via the v-band connection in order to accommodate different needs. Thus, there need not be any welding performed on the compressor housing 16 or any machining performed by an individual due to the connection present for the air intake on the compressor housing 16.

The outside portion 30 has series of steps as shown below which permit either the hose fitting or the v-band connection with the different flanges. Where the v-band is used, an O-ring may be placed over the outside portion 30.

Figure 2:
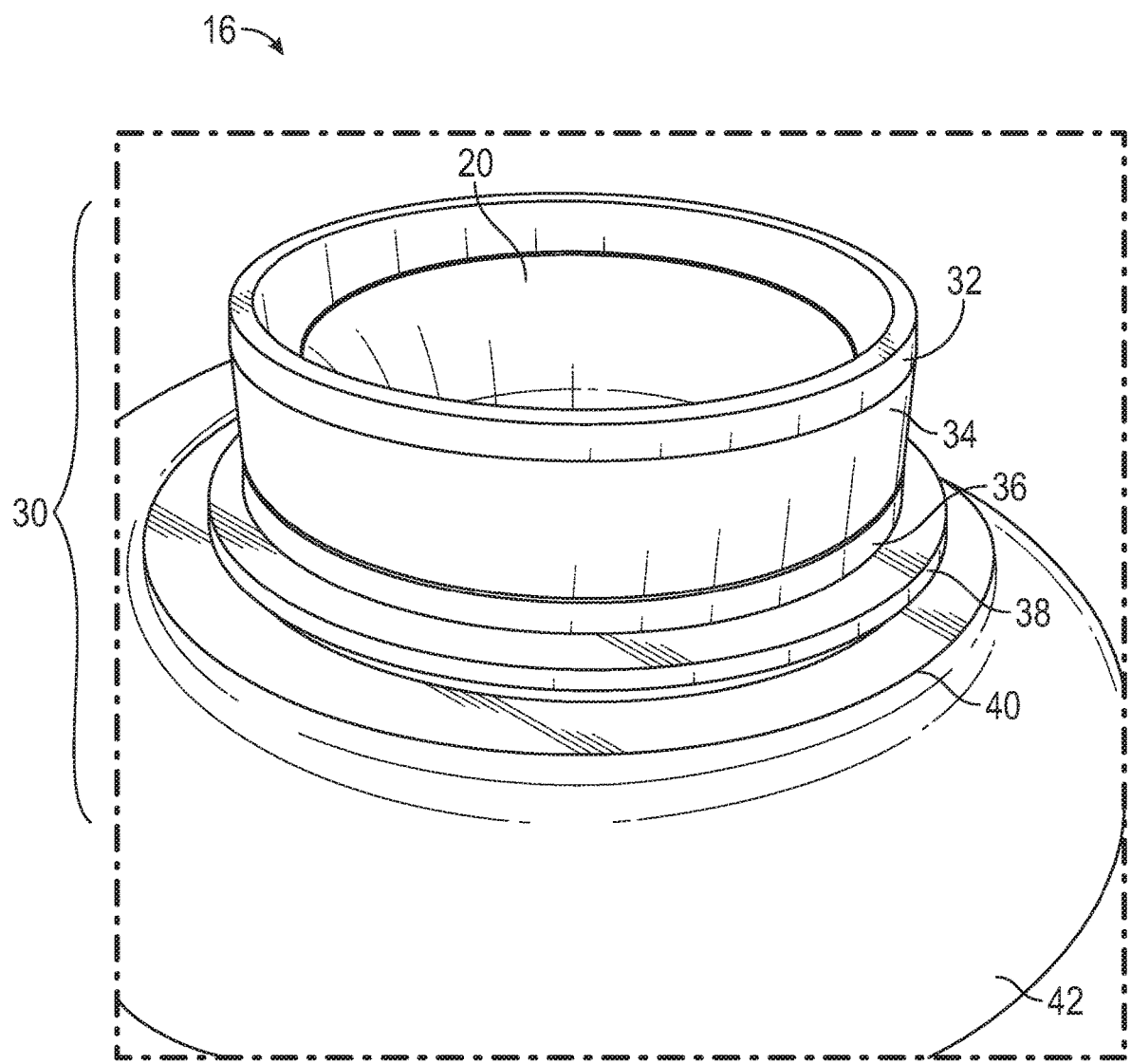
FIG. 2 is a perspective view of a compressor housing within the turbocharger assembly.

FIG. 2 illustrates the compressor housing 16 with a compressor inlet or air intake inlet 20 shown extending from the outside portion 30. An air inlet outer lip 32 is shown. Beneath the air inlet outer lip 32 is a receiving portion 34. A step portion 36 is positioned beneath the receiving portion. An outer ring portion 38 is positioned beneath the receiving portion 36. A transition portion 40 is positioned beneath the outer ring portion which transitions the outside portion 30 of the compressor housing 16 into a main body 42 of the compressor housing 16. The structure of the outside portion 30 of the compressor housing 16 adapts the compressor housing 16 to be able to interchangeably receive a flange connected with a v-band connection or receive a hose.

Figure 3:
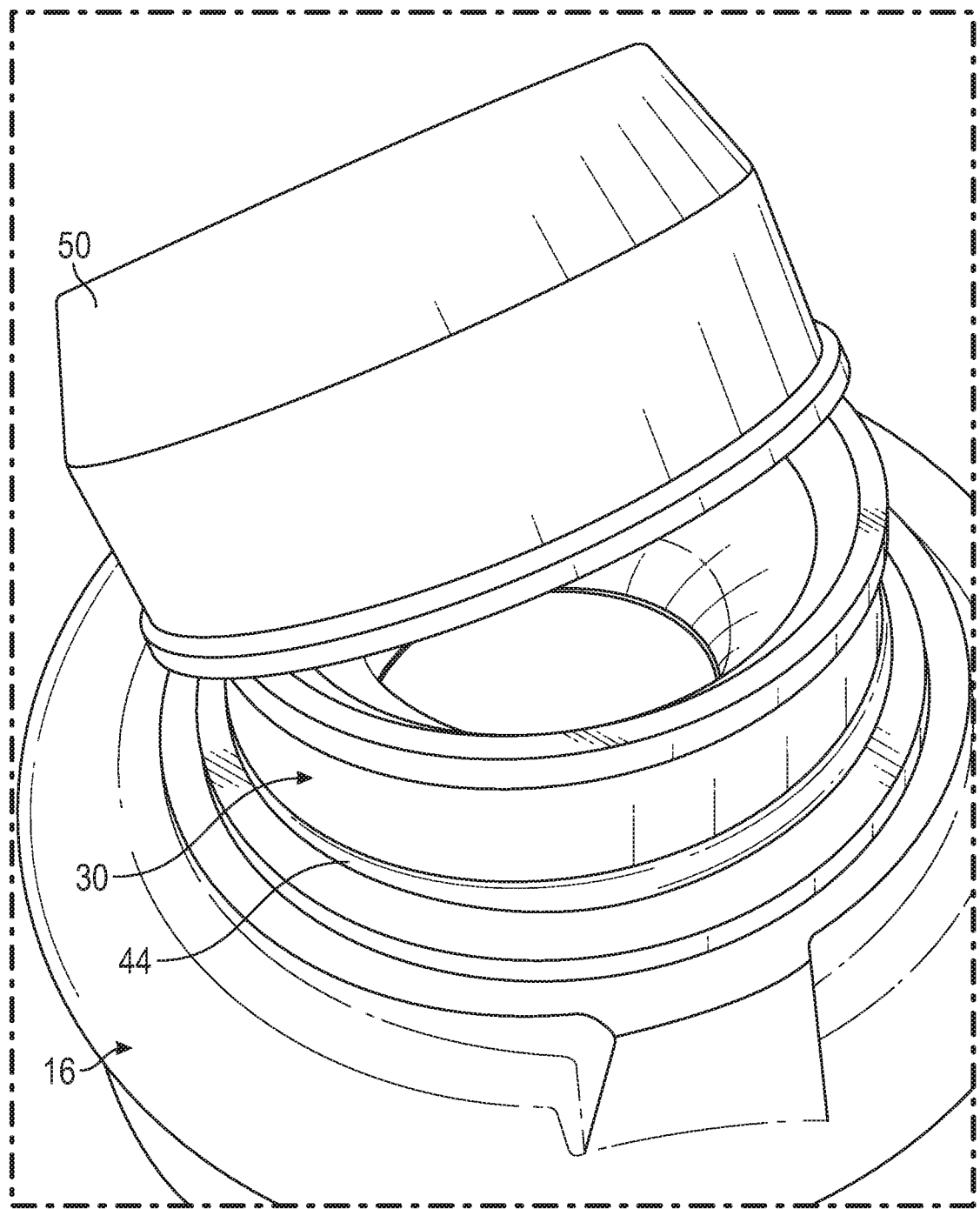
FIG. 3 is a further view of the compressor housing.

FIG. 3 is a further view of the compressor housing 16. As shown in FIG. 3, an O-ring or other seal 44 is present. Note that the O-ring is positioned around the outside portion 30 resting on the outer ring portion 38 and against the step portion 36. A flange 50 may then be positioned in place with the end of the flange 50 resting on the O-ring 44.

Figure 4:
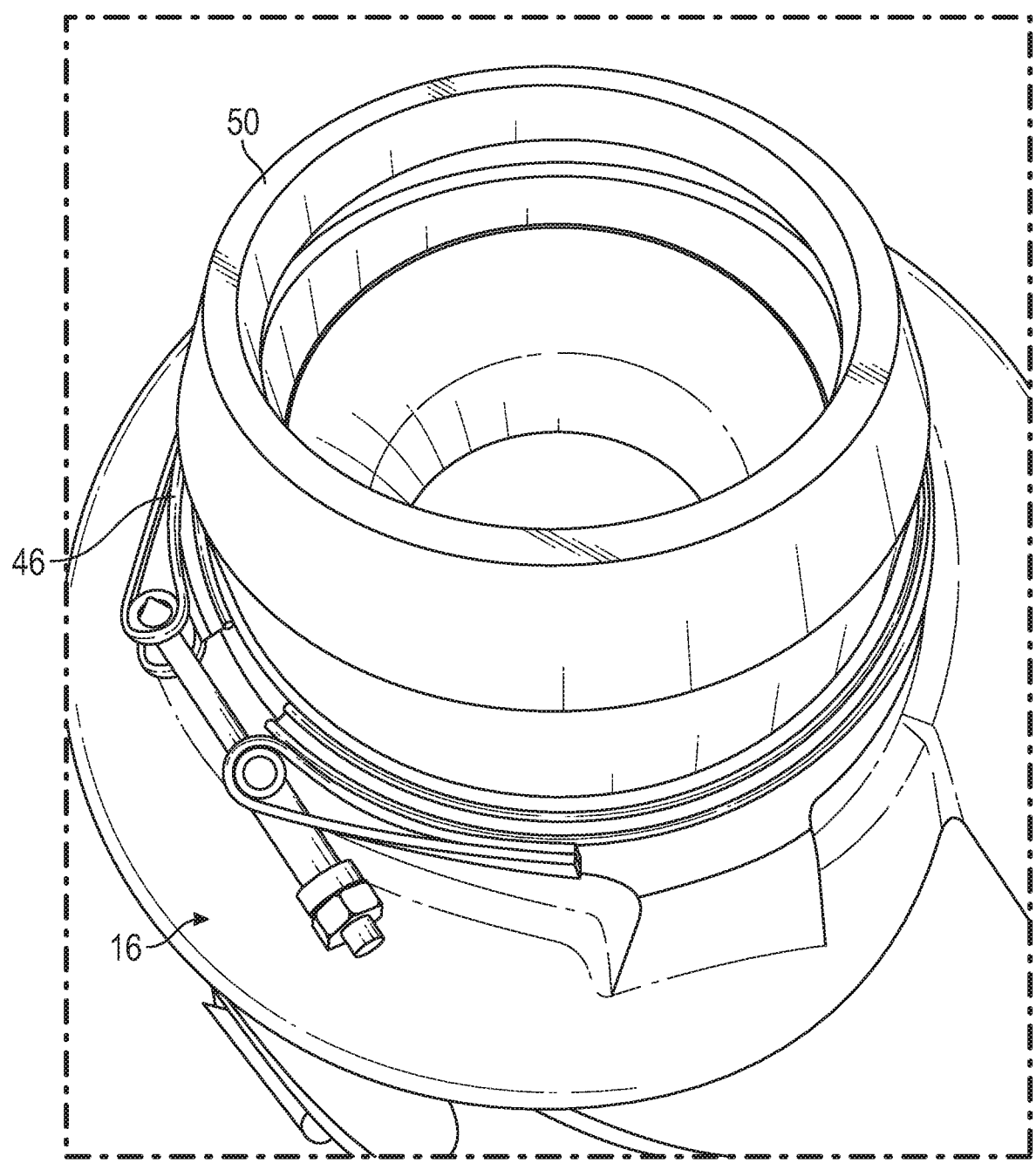
FIG. 4 is a further view of the compressor housing with a flange attached with a v-band connection.

FIG. 4 is a further view of the compressor housing 16 with a flange 50 attached with a v-band 46. The flange 50 rests on the outer ring portion. Note that the v-band 46 is positioned around a bottom portion of the flange 50 to secure the flange 50 in place against the outside portion of the compressor housing 16.

Although one type of flange 50 is shown, it is to be understood that any number of other types of flanges or adapters may be used as may be appropriate for a particular application or environment. This may include to alter diameter of the opening into the air intake inlet 20, alter the geometry of the opening into the air intake inlet 20, or otherwise better adapt to a particular use or environment.

Figure 5:
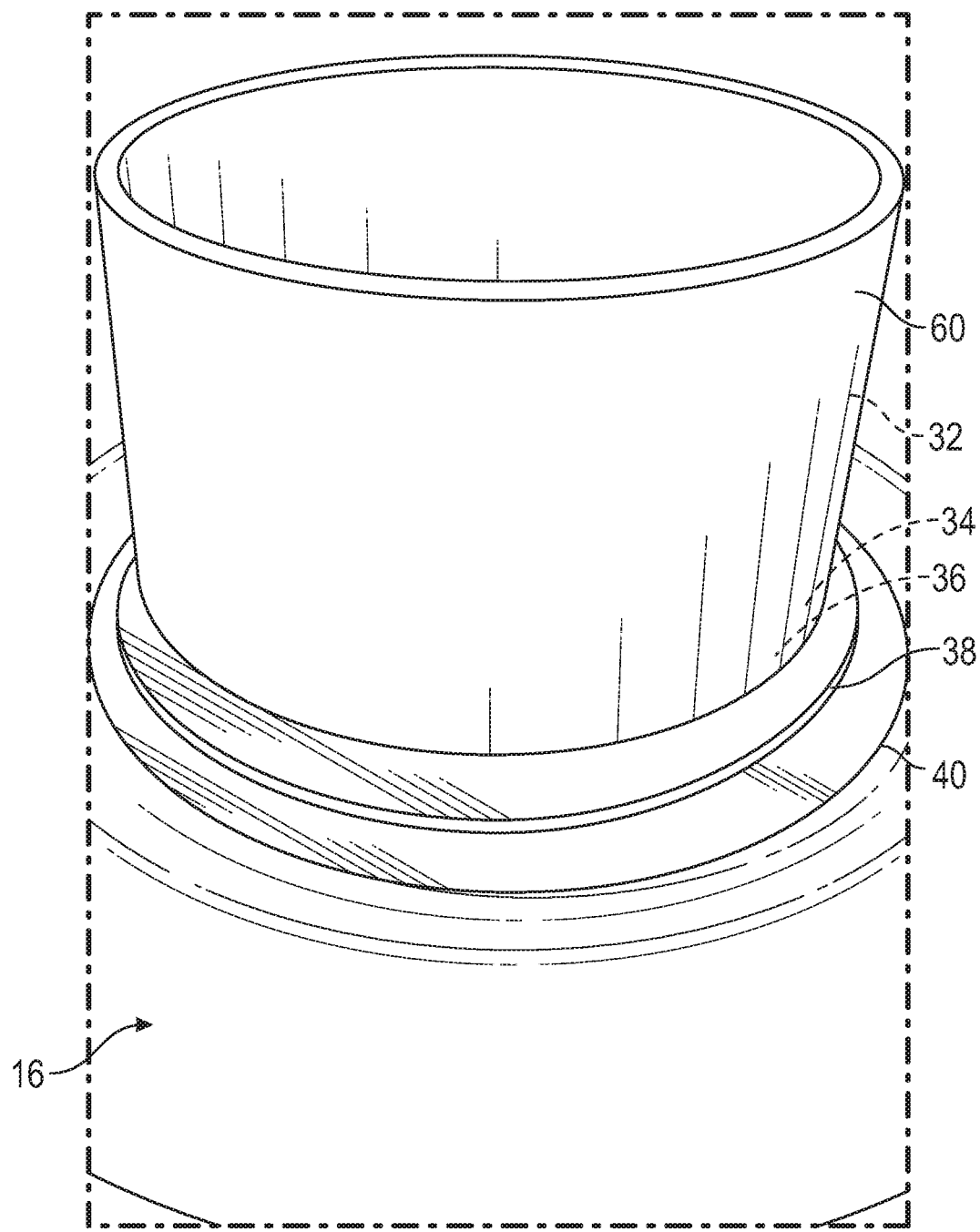
FIG. 5 is a view of the compressor housing with a hose attached.

FIG. 5 is a view of the compressor housing with a hose 60 attached. In this configuration, the hose 60 is fit over the air inlet outer lip 32, over the receiving portion 34 and onto the step portion 36. This allows for a tight connection of the hose 60. Of course, the hose 60 may be removed and instead a v-band and clamp may be used. Thus, the structure of the compressor housing shown and describes allows for interchangeable connections with either a hose or a flange and v-band. Thus, the turbo charger may be moved between vehicles and configured with the proper The invention is not to be limited to the particular embodiments described herein. In particular, the invention contemplates numerous variations in the type of flange or adaptors used, the size and shape of various components, and other variations. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. A turbo compressor housing comprising:
   a main compressor housing body having a top end and an opposite bottom end with an opening extending vertically therethrough, the opening defining an air intake inlet at the top end;
   an outside portion at the top end and positioned around the opening of the main compressor housing body;
   wherein the outside portion is configured to adapt the turbo compressor housing to interchangeably connect with one of (1) a hose and (2) a V-band connection and flange such that in a first configuration the hose is connected to the outside portion and in a second configuration the V-band connection secures the flange to the outside portion;
   wherein the outside portion comprises an air inlet outer lip, a receiving portion, and a lower lip, the receiving portion between the air inlet outer lip and the lower lip, and an outer ring portion beneath the lower lip.

2. The turbo compressor housing of claim 1 wherein the outside portion is configured to receive an O-ring positioned around the outside portion and resting on the outer ring portion when in the second configuration and wherein the outside portion is further configured to receive a flange positioned in place such that an end of the flange rests against the O-ring and the outer ring portion.

3. The turbo compressor housing of claim 1 wherein the outside portion and the main compressor housing body are a part of an integral molded body.

4. A turbo compressor housing comprising:
   a main compressor housing body having a top end and an opposite bottom end with an opening extending vertically therethrough, the opening defining an air intake inlet at the top end;
   an outside portion at the top end and positioned around the opening of the main compressor housing body;
   wherein the outside portion comprises an air inlet outer lip, a receiving portion, and a lower lip, the receiving portion between the air inlet outer lip and the lower lip, and an outer ring portion beneath the lower lip wherein the turbo compressor housing is adapted to interchangeably connect with one of (1) a hose and (2) a V-band connection and flange such that in a first configuration the hose is connected to the outside portion and in a second configuration the V-band connection secures the flange to the outside portion.

5. A system comprising a turbo compressor housing as recited in claim 4 and further comprising an O-ring and a flange and wherein in the second configuration the O-ring is positioned around the outside portion and rests on the outer ring portion and the flange is positioned in place with an end of the flange resting against the O-ring and the outer ring portion.

6. A system comprising:
a flange;
a V-band connection;
a turbo compressor housing comprising: (a) a main compressor housing body having a top end and an opposite bottom end with an opening extending vertically therethrough, the opening defining an air intake inlet at the top end, (b) an outside portion at the top end and positioned around the opening of and the main compressor housing body, wherein the outside portion comprises an air inlet outer lip, a receiving portion, and a lower lip, the receiving portion between the air inlet outer lip and the lower lip, and an outer ring portion beneath the lower lip;

wherein the outside portion of the turbo compressor housing is configured to adapt the turbo compressor housing to interchangeably connect with one of (1) a hose and (2) the V-band connection and the flange such that in a first configuration the hose is connected to the outside portion and in a second configuration the V-band connection secures the flange to the outside portion.

7. The system of claim 6 further comprising an O-ring positioned around the outside portion to rest on the outer ring portion.

8. The system of claim 6 wherein the turbo compressor housing including the outside portion forms an integral molded body.

* * * * *